March 31, 1931. W. BEUSCH 1,798,138

ELECTRICITY METER

Filed Jan. 15, 1929

INVENTOR
W. Beusch
By John D. Morgan
ATTORNEY

Patented Mar. 31, 1931

1,798,138

UNITED STATES PATENT OFFICE

WILLI BEUSCH, OF ZUG, SWITZERLAND, ASSIGNOR TO LANDIS & GYR, A-G., A LIMITED JOINT-STOCK COMPANY OF SWITZERLAND

ELECTRICITY METER

Application filed January 15, 1929, Serial No. 332,703, and in Switzerland January 24, 1928.

The invention relates to electricity meters, and more particularly to a novel and useful meter for indicating momentary and maximum values, preferably in connection with concurrent integration and registration.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, construction, arrangements, combinations and improvements herein shown and described.

The accompanying drawings, referred to herein and constituting a part hereof, illustrate one embodiment of the invention, and together with the description, serve to explain the principles of the invention.

Of the drawings:—

Figure 1:
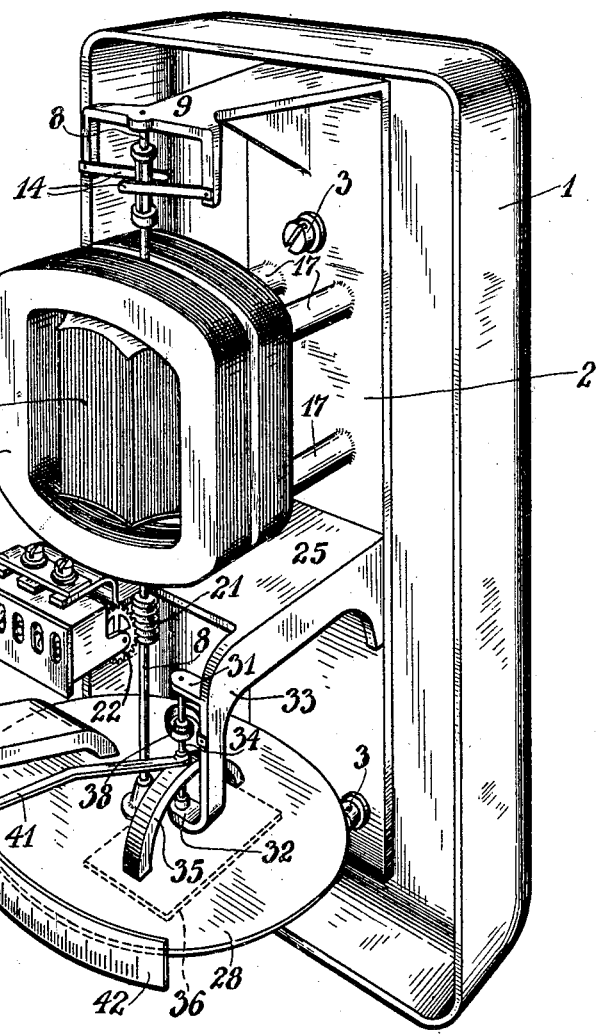
Fig. 1 is a perspective view of a meter mechanism embodying the invention.

The invention is based on the property of motor meters that the turning movement must be proportional to the wattage or current passing through the meter and that the braking moment must increase proportionally to the rate of revolution, in order that the meter shall indicate correctly. The necessary braking takes place in such meters by means of a permanent magnet, which exerts a braking force on the rotating disc. According to the known principle that action and reaction are equal, the disc also exerts a tractive force on the permanent brake magnet or magnets. In the meters usually employed, this force is taken up by the support for the brake magnet or magnets. In the present invention this tractive force is utilized in integrating motor electricity meters not only for indicating the wattage or the ampere hours but also the effective or instantaneous value, i. e. the number of watts or amperes.

Referring now in detail to the embodiment of the invention illustrated by way of example in the accompanying drawings, a portion of a meter casing is indicated at 1, and a supporting frame member 2 is fixed thereto by suitable means such as screws 3.

The rotating system of a direct-current meter is exemplarily shown as comprising a spindle 8, journaled at its upper end in a bracket 9, fixed to and extending outwardly from the frame member 2. Spindle 8 is journaled at its bottom end in a corresponding bracket (not shown) fixed to and extending outwardly from the bottom end of the member 2. A commutator 14, which may be of any known or suitable form, is mounted on the upper part of the spindle 8, and a drum armature 15 is fixed on the spindle. Coacting with the armature 15 are field coils 16, which are mounted on supporting rods 17, fixed to and extending outwardly from frame member 2.

In the exemplarily embodied form of registering means a worm 21, fixed on the spindle 8, meshes with a worm wheel 22 of a registering mechanism 23, mounted on an extension 24 of a bracket 25, fixed to and extending outwardly from frame member 2. It is obvious that the invention is equally applicable to alternating current meters.

A brake disc 28 is fixed on spindle 8, and cooperates with a suitable braking device. As shown, a permanent brake magnet 29 is mounted on the frame structure and may operate in the usual manner. In accordance with the present invention, a magnet is movably mounted in cooperation with the brake disc, or like member, to be variably positionable proportionally to the braking moment, or tractive force of the braking magnet, as it varies with the changes in the current conditions. The braking is effected, at least in part, by means of a rotatable or pivotally movable brake magnet, the turning of which is a measure of the amount of energy, watts or amperes, passing through the meter in unit time.

In the exemplary embodiment, top and bottom bearings 31 and 32 are formed on an extension 33 of the bracket 25. Journaled in the bearings is a spindle 34, on which is fixed a magnet 35, the poles of which are closely adjacent to the braking disc 28, the magnet being of arcuate or semi-circular or like form. An iron plate 36, cooperating with the magnetic field, is located beneath the disc 28, and is mounted on a bracket 37, fixed to and extending from the frame member 2.

Resilient means are provided, acting to oppose the rotative movement of magnet 35, as the magnet coacts with the rotating meter disc. As embodied, a flat coil spring 38 has one end thereof fixed to spindle 34 and the other end fixed to the bracket 33. Thus as the magnet moves rotatively, due to the rotation of disc 28, spring 38 is wound or tightened, until a balance is effected between the drag of the magnet 35 and the tractive effort of rotating disc 28. The embodied form of indicating means for the foregoing mechanism comprises a pointer arm 41 fixed on spindle 34, with its end movable along a scale or index member 42, fixedly supported in any suitable manner.

By reason of the braking force inherent in the magnet 35, this magnet tends to counteract any movement or alteration in position of the disc 28, and since magnet 35 is not fixed, it can follow the turning of the disc 28 until the force exerted by the spring 38 overcomes the braking power of the magnet and determines the deflection of the magnet and therewith of the pointer 41 over scale 42. The deflection of magnet 35 is thus proportional to the rate of revolution, or to the torque, or to the voltage or current flowing through the meter, and the pointer 41 enables the wattage or the current to be read from the scale 42.

Figure 2:
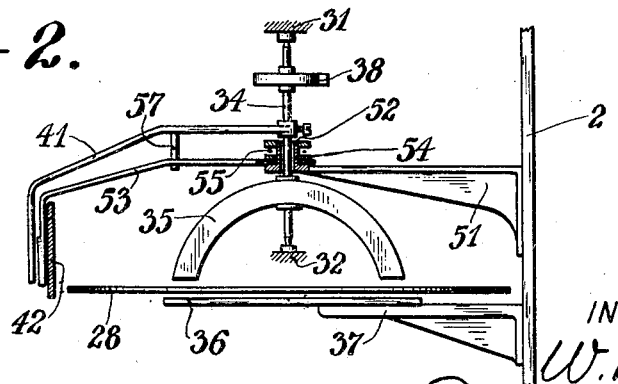
Fig. 2 is a fragmentary detail showing a modification.

In Fig. 2 is shown a modification comprising a maximum indicating device. In this form a bracket 51 is fixed to and extends outwardly from the frame member 2, and a grooved sleeve 52 is formed in the end of the bracket arm, and loosely embraces spindle 34. An index arm 53 is loosely mounted on sleeve 52. A washer 54 and a light coil spring 55, hold the index arm in position with light friction. Fixed to arm 41 is a pin 57, which projects into the path of the loosely mounted but friction held index pointer 53. Thus as index arm 41 moves with magnet 35, it will move friction held arm 53 to the indicating position for maximum demand or consumption between resettings thereof.

The arrangement of the rotary brake magnet, the axis of which theoretically may coincide with the axis of the rotating system, may advantageously be such that the influence of the eddy current damping in alternating current meters is partly or entirely compensated. For this purpose the movement of the brake magnet must be so arranged that its share in the braking decreases as the deflection increases. This can be effected for example by removing, by any suitable means, the magnet from the brake disc as the deflection increases, so that the action of the magnet is weakened, as for instance, a short screw thread or helical cam.

Figure 3:
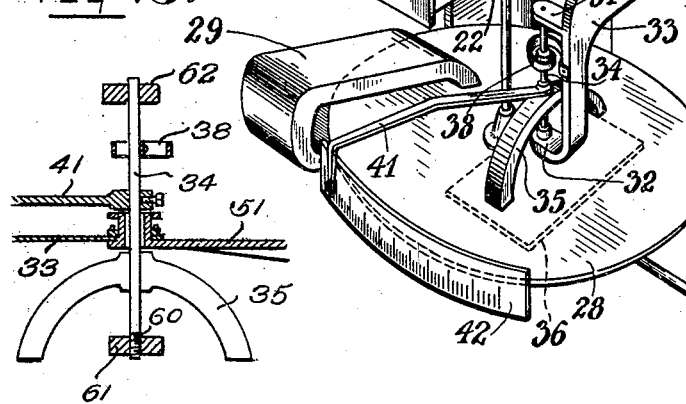
Fig. 3 is a fragmentary vertical section showing a modification of the construction shown in Fig. 2.

As shown by Fig. 3 of the drawings, magnet 35 is rotatably mounted by shaft 34 and means are provided for moving the magnet towards and away from the rotating meter disc 28 as the magnet is rotated by the disc against the tension of spring 38. In this embodiment, the lower end of shaft 34 is screw-threaded, as at 60, and is supported in a correspondingly threaded bearing 61 while the upper end of the shaft 34 is vertically slidable in bearing 62. As magnet 35 is turned in a counter-clockwise direction, magnet 35 is lifted away from disc 28 and decreases the breaking effect of the magnet on the disc. Shaft 34 also carries the pointer 41 which indicates the instantaneous demand, and the maximum demand pointer 33 is mounted on bracket 51 and operates as previously described in connection with Figs. 1 and 2.

With ampere-hour meters, the arrangement can be such that the normally unavoidable falling curve at low loads due to friction is compensated for at least in part.

A contact device can also be combined with the indicator arm 41 or if a maximum pointer is provided, with the latter, so that when a definite maximum is reached a signal is given.

When motors are started, there frequently occur high starting currents of quite short duration, which also result in a corresponding increase in the energy. One might be of the opinion that these high peak loads would be indicated unaltered by the arrangement above described. This however is not the case. In the first place the meter has a comparatively high moment of inertia, moreover the driving disc of the electricity meter is strongly damped by the permanent brake magnet. Moreover the above described movable measuring system likewise has a definite inertia, so that in practice transient overloads, if they do not last longer than about half a second, are not indicated at their full magnitude.

The arrangement can be employed with all motor meters which are braked by permanent magnets, thus for example with watt hour meters for direct, alternating, single and polyphase currents, for wattless power meters, for apparent power meters, for ampere-hour meters, for meters which indicate a mixed magnitude and for many others.

The invention in its broader aspects is not limited to the specific mechanisms shown and described but departures may be made therefrom within the scope of the accompanying claims without departing from the principles of the invention and without sacrificing its chief advantages.

What I claim is:—

1. An electricity meter including in combination a driven meter element, a magnet movable by the driven meter element, means opposing the action of said driven meter element on said movable magnet, and means for diminishing the braking effect of the magnet on said driven element as the deflection of the magnet is increased.

2. An electricity meter including in combination a driven meter element, a magnet movable by the driven meter element, a spring opposing movement of the magnet and means for decreasing the braking effect of the magnet on said driven element as the action of the meter element on the magnet increases.

3. An electricity meter including in combination a driven meter element, a magnet movable by the driven meter element, means opposing movement of the magnet and means for driving the magnet away from the driven element as the action of the meter element on the magnet increases.

4. An electricity meter including in combination a driven meter element, a braking magnet movable by the driven meter element, a second and stationary braking magnet, means opposing the movement of the movable braking magnet, and means for moving the magnet away from the driven element as the action of the meter element on the magnet increases.

In testimony whereof, I have signed my name to this specification.

WILLI BEUSCH.